United States Patent [19]

Bradley

[11] 4,230,994

[45] Oct. 28, 1980

[54] PULSE CIRCUIT APPARATUS FOR GAS DISCHARGE LASER

[75] Inventor: Laird P. Bradley, Livermore, Calif.

[73] Assignee: The United States of America as represented by the United States Department of Energy, Washington, D.C.

[21] Appl. No.: 911,248

[22] Filed: May 31, 1978

[51] Int. Cl.$^3$ .................. H01S 3/097; H05B 41/14
[52] U.S. Cl. .................. 331/94.5 PE; 315/241 R
[58] Field of Search .................. 331/94.5 PE, 94.5 P, 331/94.5 G; 313/231.4; 315/111.2, 227 R, 237, 240, 241 R, 326; 330/4.3

[56] References Cited

U.S. PATENT DOCUMENTS

| 3,721,915 | 3/1973 | Reilly | 331/94.5 PE |
|---|---|---|---|
| 3,795,874 | 3/1974 | Pan et al. | 331/94.5 PE |
| 3,887,882 | 6/1975 | Smith | 331/94.5 PE |

OTHER PUBLICATIONS

Ewing et al., "Laser Action on the $^2\Sigma+\frac{1}{2}\rightarrow{}^2\Sigma+\frac{1}{2}$ Bands of KrF and XeCl", *Applied Physics Letters*27, No. 6, Sep. 15, 1975, pp. 350-352.
Mangano et al., "Electron-Beam-Controlled Discharge Pumping of the KrF Laser," *Applied Physics Letters*, vol. 27, No. 9, Nov. 1975, pp. 495-498.
Daugherty et al., "Attachment-Dominated-Electron-Beam-Ionized Discharges," Applied Physics Letters, vol. 28, No. 10, May 15, 1976, pp. 531-533.
Jacob et al., "Modeling the KrF Laser Discharge," *Applied Physics Letters*, vol. 28, No. 12, Jun. 15, 1976, pp. 724-726.
Sarjeant et al., "A Scalable Multiatmosphere High--Power XeF Laser", *Applied Physics Letters*, vol. 30, No. 12, Jun. 15, 1977, pp. 635-637.
Sarjeant et al., "Parametric Study of a Constant E/N Pumped High-Power KrF Laser," IEEE J. of Quantum Electronics, vol. QE-14, No. 3, Mar. 1978, pp. 177-184.
Duncan et al., "Compact Electron Accelerator for Pumping Gas Lasers," Lawrence Livermore Laboratory Report UCRL-78537 (1976).
"*Laser Program Annual Report*"-*1976*, Lawrence Livermore Laboratory Report, UCRL-50021-76, pp. 6-5-5-6-59.

*Primary Examiner*—James W. Davie
*Attorney, Agent, or Firm*—James E. Denny; Roger S. Gaither; P. Martin Simpson

[57] ABSTRACT

Apparatus and method using a unique pulse circuit for a known gas discharge laser apparatus to provide an electric field for preconditioning the gas below gas breakdown and thereafter to place a maximum voltage across the gas which maximum voltage is higher than that previously available before the breakdown voltage of that gas laser medium thereby providing greatly increased pumping of the laser.

15 Claims, 5 Drawing Figures

PULSE CIRCUIT APPARATUS FOR GAS DISCHARGE LASER

BACKGROUND OF THE INVENTION

The invention described herein was made at Lawrence Livermore Laboratory in the course of, or under, Contract W-7405-ENG-48 between the United States Department of Energy and the University of California.

The invention pertains to pulse circuits for gas discharge devices, where such devices are laser components such as laser oscillators and amplifiers. More particularly, this invention relates to preconditioning the gas for uniformity of pumping and to attaining a voltage across the gas which is higher than the breakdown voltage of the gas to increase the amount of pumping. The breakdown voltage and time to achieve breakdown will vary with several factors, not the least of which are gas density, gas pressure, discharge geometry and gas composition.

Pumping gaseous laser media through electron beams and through discharges across the gas are old in the art. There are many categories of gaseous laser media such as the molecular media exemplified by $CO_2$. Of recent interest have been the rare gas excimer lasers, and the rare gas halide excimer lasers, and the rare gas atomic oxygen and the rare gas atomic iodine transfer lasers. For example, laser action was reported for an electron-beam pumped apparatus for bands of KrF and XeCl in Applied Physics Letters 27, 350 (1975). The excimer systems are well known for their efficiency derived in part from a bound excited state and weakly bound or unbound lower state, the excited state having a lifetime of typically 10 nanoseconds. Interest in the above lasers is due additionally to their ultraviolet and visible wavelengths. Such lasers are useful in laser isotope separation at relatively low energy per pulse (less than or equal to one joule) and at high repetition rates (greater than or equal to 1 kHz). These lasers are also useful in attaining laser fusion which requires much higher energy pulses but much lower repetition rates. Such lasers are useful for other purposes known to persons working in the laser art.

There are several known means to pump a gaseous laser medium such as a direct electron pump, a discharge pump or an augmented discharge pump. In particular, rare gas halide (KrF and XeF) and iodine have been made to lase using discharges although not as efficiently as with a direct e-beam pump. With the same deposited energy and pump time, the e-beam requires a high voltage while the discharge requires a high current. In addition, the e-beam pump uniformity is attained with the drawback of a fragile foil for e-beam entry into the gas. The discharge has incipient problems of pump nonuniformity and arcing and requires a lower inductance source because of the higher currents. In an effort to ease some of these limitations, the augmented discharge pump is employed as described below.

One method for achieving pump uniformity in a molecular laser is disclosed in U.S. Pat. No. 3,721,915 to James P. Reilly. Reilly uses two voltages on the discharge electrodes. The first is a "fast high-voltage discharge which creates uniform electron density . . . " (at Column 15, lines 58–60), while the second is ". . . a second lower voltage discharge is provided which gives the first discharge the necessary electron temperature for preferably optimum laser excitation, with no significant increase in electron density" (at Column 15, lines 64–68). This system first ionizes the gas and then places the pump energy into the gas at a lower voltage. It should be noted that the pumping of the gas is at a lower voltage, and thus lower energy (and it appears to be below breakdown), than the ionization voltage. This system uses energy input for pumping over a period of time long compared to the breakdown time of the gas. It leaves unsolved the problem of a maximum amount of pumping in a laser in a time near the breakdown time of the gas, which may be on the order of a few nanoseconds from the start of the pumping. Some pulse stacking schemes can compress laser time 10 to 20 or more fold. The maximum amount of pumping as early as possible in the excitation process can be important.

The reasons for one going to the augmented discharge pump may be summarized as (see Applied Physics Letters 27, 495 (1975) at 496):

1. beam energy losses in the foil and its support structure are less
2. energy losses due to scattering of the electron beam in the foil and gas are reduced
3. rare-gas metastable production efficiencies may be larger, 40–50% with electron-beam pumping against a possible 70% with discharge pumping.

To enable the augmented discharge pump further to realize its advantages over electron beam pumping, improvements in pump uniformity and increased pumping voltages are needed.

The augmented discharge pump uses an auxiliary means of electron production to produce uniform electron deposition, to provide initial electron density, and to replace electron losses due to recombination and attachment. This auxiliary electron production may be from any of several known sources, such as an e-beam, a plasma, photoionization, controlled predischarges, or a combination thereof. The first known rare-gas-halide laser to be pumped by an augmented discharge was reported in Applied Physics Letters 27, 495 (1975). The auxiliary electron production was through a cold cathode electron gun of 150 keV, 8 amperes/cm$^2$, 135 nsec pulse over a 2×20 cm beam into a discharge cavity 2×2×20 cm with mixture mole fractions of 0.001/0.02/0.979 for $F_2$/Kr/Ar, respectively. However, there was still some arcing during the discharge, and the electron beam was started 35 nsec before the discharge. Two later papers on this work are Applied Physics Letters 28, 724 (1976) and Applied Physics Letters 28, 581 (1976), the latter implying an upper limit of a 10 kV stable operating voltage. Similar work using large e-beam pumping was done at Lawrence Livermore Laboratory (LLL) using a 250 kV vacuum diode e-beam driven directly by a 400 kV Marx bank power source to deliver a flat-topped beam current pulse with a rise time of 20 nsec, pulse width of 110 nsec, across a e-beam window of 2×40 cm at beam current densities 2 to 15 amperes/cm$^2$, into a discharge region with an electrode gap of 2.7 cm with a voltage applied to the electrodes of up to as high as 30,000 volts. The electron beam device was reported in UCRL-78537 in 1976 for submission to the International Pulsed Power Conference in Lubbock, Tex., on November 9–11, 1976. This LLL discharge system and part of its test results (using the present invention) were reported in UCRL-50021-76 LLL's Laser Division Annual report at pages 6-55 to 6-59, which Annual report was made available to the public after Mar. 28, 1978.

At the same time, independent of and without the knowledge of the inventor, another researcher W. J. Sarjeant and his coworkers at the National Research Council of Canada, Division of Physics, Ottawa were working on a laser excitation circuit which appears to apply an overvolted potential across the electrodes of a gas discharge laser in less time than the gas takes to breakdown. This work was initially reported, orally only, in a post deadline paper at the Conference on Laser Engineering Applications held at Washington, D.C., June 1-3, 1977. As a result of hearing this talk, the inventor talked privately with W. J. Sarjeant about the Sarjeant et al apparatus and about this inventor's work on the present invention. Sarjeant et al discloses a spark gap for the rapid switching of a potential to overvolt a gas discharge cell. Sargeant et al uses uv preionization and does not seem to consider a simple electric field for preconditioning without further ionization of the gas. The Sarjeant et al work is reported in Applied Physics Letters 30, 635 (15 June 1977) and in IEEE Journal of Quantum Electronics QE-14, 177 (March 1978).

The LLL system described in UCRL-50021-76 and shown schematically in FIGS. 1 and 2 of this application was operated successfully as in prior art apparatus but still had undesirable limitations. The voltage could not run above the breakdown voltage of the $Ar/Kr/F_2$ mixture and still avoid the unwanted arcing. The rapid current rise of the power source could not be fully utilized, and also the pumping uniformity needed to be improved. Thus, these problems are substantially overcome by the improvements of this invention.

SUMMARY OF THE INVENTION

The present invention overcomes these undesirable limitations and provides apparatus and method for using a unique pulse circuit for a gas discharge device. This pulse circuit provides an electric field for preconditioning the gas by smoothing the electron distribution in that gas in order to achieve pumping uniformity. Also, this pulse circuit attains substantially increased laser pumping by placing a voltage across the discharge region in a time faster than the breakdown time of the gas and at a voltage higher than the breakdown voltage of the gas laser medium. No arcing was observed in the discharge. Furthermore, the rapid current rise time of the power source was much more fully utilized. This invention has provided a three-fold increase in the voltage available for pumping a laser (from 7-10 kV to 30 kV) as well as providing a much more uniform discharge at this high voltage level thereby providing a significant advance over the state of the art.

One object of the present invention is to increase pump uniformity in a gas discharge device.

Another object of the present invention is to place a higher voltage across the gas in a gas discharge device than the breakdown voltage of that gas.

Another object of the present invention is to increase pump uniformity in a gas discharge laser.

Another object of the present invention is to place a higher voltage across the gas in a gas discharge laser than the breakdown voltage of that gas.

Another object of the present invention is to provide a pulse circuit to increase pump uniformity and then to attain maximum pumping of a gas discharge laser by applying a higher voltage across the gas than the breakdown voltage of the gas and in a time shorter than that necessary for the gas to breakdown.

Another object of the present invention is to increase gas discharge laser efficiency.

Another object of the present invention is to place an electric field across the gas in a gas discharge laser to precondition the gas for uniformity of pumping during the discharge.

Another object of the present invention is to employ a preconditioning electric field across the gas in a gas discharge laser for increasing pump uniformity and to place a higher voltage across the gas than the breakdown voltage of that gas for increased pumping.

Another object of the present invention is to increase the efficiency of an augmented gas discharge laser.

Another object of the present invention is to increase the efficiency of an augmented gas discharge laser which uses an electron beam auxiliary pump.

Another object of the present invention is to increase the efficiency of an augmented gas discharge laser which uses an ultraviolet auxiliary pump.

Another object of the present invention is to increase the efficiency of a rare gas halide gas discharge laser.

Another object of the present invention is to increase the efficiency of a KrF excimer gas discharge laser.

Other objects and advantages of the present invention will become clear from the following drawings and detailed description of the present invention.

DESCRIPTION OF THE INVENTION

Augmented gas discharge laser pumping provides a lower voltage route to pumping gas discharge lasers than does the electron beam. Also, it can avoid some of the losses of an electron beam pump in the delicate foil window between the electron beam gun and the laser medium gas. Rare gas metastable production efficiencies may be increased to a possible 70% for discharge pumping versus 40-50% for electron beam pumping. An augmented gas discharge laser is a good laser for laser isotope separation where high repetition rates are required, preferably in the visible or near ultraviolet, and in laser fusion where the near ultraviolet and visible wavelengths offer enhanced laser-target interaction over the infrared lasers predominately in use for large lasers at this writing. KrF specifically has a spectral line directly useful for the selective excitation of $^{235}U$ amid $^{238}U$, preparatory to $^{235}U$ separation. Consequently, there is much interest in the rare gas halide laser and especially in KrF. As a result, the most efficient pumping method is sought for a rare gas halide laser in laser isotope separation. This method is the augmented gas discharge.

Figure 1:
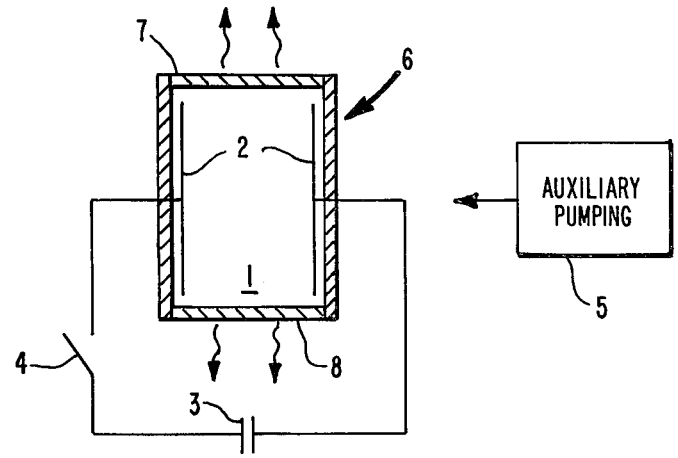
FIG. 1 is a schematic circuit diagram of prior augmented gas discharge devices.

FIG. 1 is a schematic circuit diagram of prior augmented gas discharge lasers. The gas discharge laser medium 1 is between two discharge electrodes 2. A voltage and power source 3 charges the two discharge electrodes 2 when switch 4 is closed. Auxiliary pumping means 5 increases the free electrons in the laser medium to produce uniform electron deposition, to provide initial electron density, and to replace electron losses to recombination or attachment. This auxiliary electron production may be from an e-beam, a plasma, photoionization, controlled predischarges, or a combination of these. Chamber (or cavity) 6 contains the gaseous laser medium, and mirrors 7 and 8 provide for partial transmission and partial reflection at the cavity ends for the laser wavelength. One mirror may be totally reflecting if output in one direction is desired.

Figure 2:
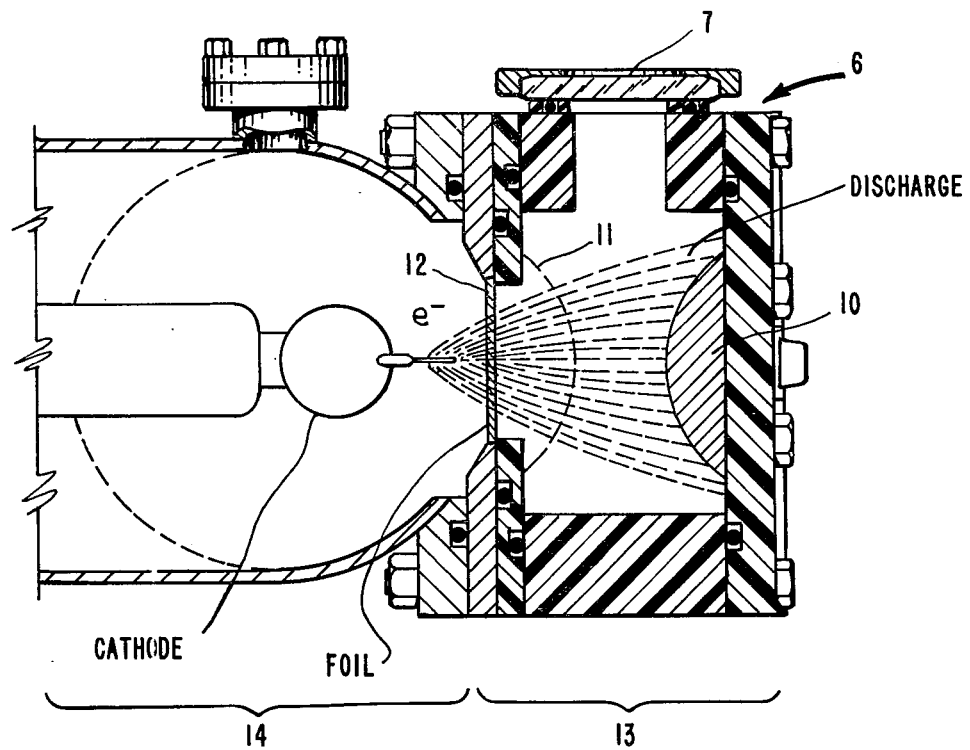
FIG. 2 is a cross-sectional view of major components in the electron beam source and the gas discharge cell.

FIG. 2 shows a cross-sectional view of major components in the electron beam source 14 and the gas discharge cell 13, as the FIG. 1 apparatus, that was used at Lawrence Livermore Laboratory (LLL) before being modified by the present invention. The electron beam source 14 is described in UCRL-78537 (1976) referred to above in the *Background of the Invention*, which is incorporated herein by reference. Briefly, the e-beam source 14 is driven directly by a 400 kV Marx bank. The output impedance of the pulsed power supply is adjusted with tuned circuits in series with the e-beam source to give a nominally flat-topped beam current pulse with a rise time of 20 nsec and a pulse width of 110 nsec over a window area of $2 \times 40$ cm. Beam-current densities between 2 and 15 amperes/cm$^2$ are obtained by varying the anode-cathode spacing of the e-beam source. This e-beam source 14 shown in FIG. 2 is intended as one of the auxiliary pumping means 5 shown in FIGS. 1, 3 and 4.

The FIG. 2 discharge chamber 13 was constructed of Teflon. The sustainer electrodes 10, 11 were cut to a semi-Rogowski profile. There is a solid aluminum electrode 10 and fine stainless steel mesh electrode 11 backed by a 25 micron thick kapton foil 12 which separates the discharge cell 13 from the vacuum in the e-beam source 14. The above identified (LLL) apparatus of FIG. 2 utilizes a parallel array of eight pulse forming networks schematically shown as the circuit in FIG. 1, each with an individual switch with the array connected to the discharge electrodes (2 in FIG. 1; 10 and 11 in FIG. 2) via a low inductance path. Each pulse forming network is composed of three 2.0 nF ceramic capacitors, connected in a ladder network with appropriate inductances to give a 100 nsec FWHM pulse. This pulse forming network array was pulse charged from a separate capacitor and switch (a 150 nF capacitor FWHM 600 nsec current period), thereby permitting operation well above the typical rated voltage of the ceramic capacitors. This circuit provides a low inductance circuit (20 nH), which is still assembled from readily available commercial components. A wide range of gas mixtures are used with one being 1000:100:10 Torr of Ar:Kr:F$_2$, respectively yielding gains of 12%/cm of input power and densities of 1.5 MW/cm$^3$. This apparatus is discussed in UCRL-50021-76 at pages 6-55 to 6-59. Similar apparatus is used elsewhere and is well known as may be seen in Applied Physics Letters 27, 495 (1975) showing the first use of such apparatus for a KrF laser.

Figure 3:
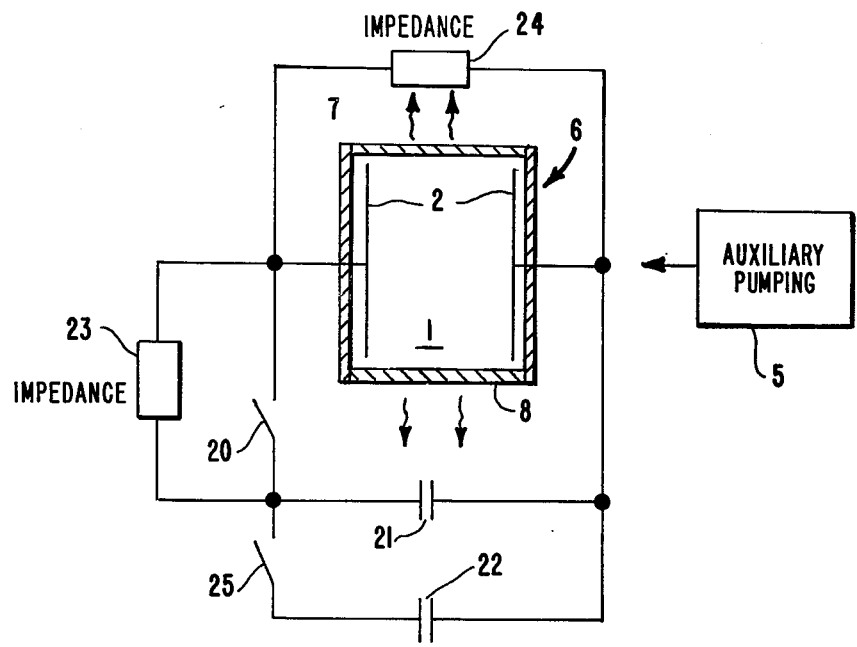
FIG. 3 is a schematic circuit diagram of an augmented gas discharge laser utilizing the novel pulse circuit of this invention with a voltage source to create a preconditioning electric field across the gas and a voltage and switching system capable of placing a higher voltage across the gas than the breakdown voltage of that gas in a time faster than such a breakdown could occur.
Figure 4:
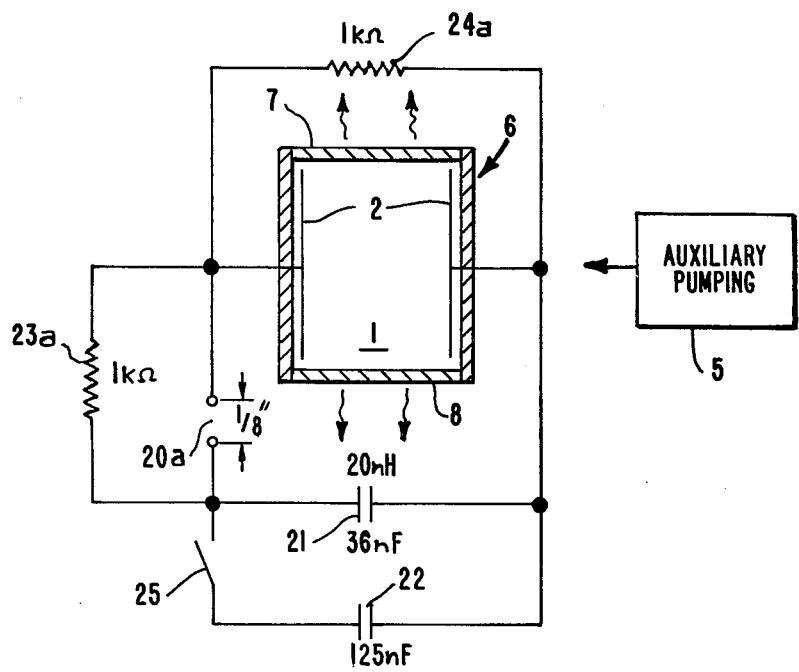
FIG. 4 is a more detailed schematic circuit diagram of an augmented gas discharge laser of FIG. 3 showing this invention with a resistance voltage divider to create a preconditioning electric field across the gas and with a spark gap to switch a voltage source in a time faster than the time for breakdown of the gas for placing a voltage across the gas which voltage is higher than the gas breakdown voltage.

The claimed invention shown in FIG. 3 and FIG. 4 uses the same e-beam source and gas discharge apparatus as in FIGS. 1 and 2 but altered with a novel pulse forming circuit to the extent that there is an impedance bridge across the gas discharge laser 1 (attached to the two discharge electrodes 2) and across a rapid switch means 20, which connects a first means for supplying power 21 to the two discharge electrodes 2. This first means is a known power source 21, such as a capacitor bank, for supplying power to the discharge electrodes at a voltage higher than the breakdown voltage of the laser medium gas between the two discharge electrodes 2. As voltage is increased across the gas the discharge breakdown is associated with a marked rise in conductivity and increase in discharge current. For breakdown, one distinguishes the DC or quasistatic (slowly time varying) breakdown from the pulsed highly overvolted breakdown. The latter results from a rapidly applied voltage. As used herein the term "breakdown" is defined to be the highly overvolted breakdown. The rapid switch means 20, which is a known switch, such as a spark gap or LASS switch, connects the power source 21 to the two discharge electrodes 2 in a time shorter than the time necessary for breakdown of the gas to occur. A second means for supplying power 22 is a known power source such as a capacitor bank, connected in parallel to the first means for supplying power 21. The second power source 22 supplies power to the first power source 21 and also supplies the voltage for the preconditioning electric field between the two discharge electrodes 2 through the impedance bridge. This impedance bridge is composed of two connected impedance means 23, 24, where the first impedance means 23 is connected in parallel to the rapid switch means 20 and the second impedance means 24 is connected in parallel to the gas discharge laser. Auxiliary pumping means 5, as in the prior art, continues to serve the functions of increasing the free electrons in the laser medium to produce uniform electron deposition, of providing a higher initial electron density and of replacing electron losses to recombination or attachment. As the name implies, it also does some pumping. Switch 25 connects power source 22 with power source 21 and the rest of the circuit.

Figure 5:
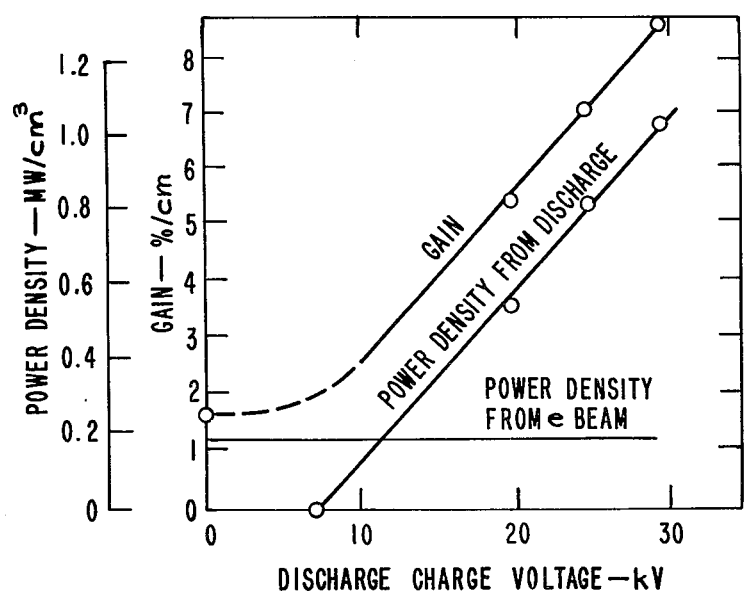
FIG. 5 is a graph of the power density and of the gain versus discharge voltage for data taken on the FIG. 4 apparatus.

The gas discharge device using the novel pulse forming circuit of this invention was the FIGS. 1 and 2 apparatus altered to the above FIG. 3 circuit, and more specifically FIG. 4 shows the circuit elements and values used. The gas discharge laser 1 is a chamber filled with the laser gas medium of 760:100:10 Torr Ar:Kr:F$_2$, respectively in a chamber 2 cm (across)$\times$36 cm (long) 2.7 cm (wide), the last dimension being the spacing between the two discharge electrodes 2. The first means for supplying power was a capacitor array 21 as described above, having a capacitance of 36 nanofarads and a charge up to 30 kilovolts. The second means for supplying power is also a capacitor array 22 of 125 nanofarads and is charged up to 30 kilovolts. The rapid switch means is a spark gap 20$a$ in one atmosphere pressure of air with a $\frac{1}{8}$ inch gap between convex electrodes. The switching is due to overvoltage of the spark gap. The first impedance means is a first resistor 23$a$ of 1 kilo Ohm, and the second impedance means is a second resistor 24$a$ of one kilo Ohm. FIG. 5 is a graph of power density and of gain versus discharge voltage showing the actual gain characteristics of the apparatus using the novel pulse circuit of FIG. 4.

An example of the sequence of events that gives the two potentials to this discharge and achieves the reported results is:

A. Switch 25 is closed and this does three things:
1. starts charging of power source 21 by power source 22;
2. places a potential difference across the electrodes 2 by the two resistors 23a and 24a to precondition the gas;
3. places a potential on spark gap 20a which leads to triggering the spark gap at a desired potential or time.

B. After about 300 nsec from the closing of switch 25, the power source 21 is charged and the spark gap 20a is triggered in about 1 nsec or less.

C. With the spark gap triggered, most of the power put into power source 21 from power source 22 flows through the spark gap 20a (since it is the lowest impedance path) to place a new, higher, overvolted potential across the discharge electrodes.

The elements of this circuit are chosen individually and collectively for their low inductance characteristics (20 nH) in order to achieve rapid current rise times. The voltage rise time must be faster than the time for breakdown of the discharge gas which for the present invention was approximately 10 to 100 nsec. The current rise time may be longer with the period of the current pulse lasting over the pumping time, which was about 110 nsec for the FIG. 4 apparatus. Power supplies 21 and 22 are of conventional design put together from commercially available components as described for FIG. 2 above. Circuit inductance places an upper limit on the successful operation of the present invention. Since gas pressure discharge electrode spacing and geometry, and type of gas all vary the breakdown time and potential of an apparatus, the upper limits on the inductance will vary accordingly.

The series switch and bias circuit permitted operation at 30 kV whereas operation without this circuit (FIG. 1 and FIG. 2) was limited to about 8–10 kV. Without the switch, the discharge was usually observed to contain arrays of arcs and was always very nonuniform. With the series switch, the gain was found to be directly proportional to the charge voltage, and hence this circuit increased the gain 3 times. Thus, this circuit provides improved discharge and gain uniformity and higher laser gain. The improved laser gain is now substantially limited by the power source voltage up to the energy storage limits of the KrF gas discharge system. Since there appears to be no limiting instabilities for this discharge system, the gain is expected to scale linearly at still higher pumping potentials. Also, the invention is applicable to a wide range of laser media, not just to KrF.

In summary, the claimed invention provides a gas discharge laser with a novel pulse circuit which allows one to begin discharge pumping (i.e., supply power to the laser medium) with more energy initially available for pumping, than previously obtainable. By means of this invention, in a very short time (from 1 to 10 nsec) a voltage higher (30 kV) than the breakdown voltage (10 kV) of the laser medium gas (KrF) is applied to the electrodes in a time less than that necessary for the gas to break down, approximately 10–100 nsec. This novel circuit also assures uniform pumping due to the preconditioning electric field before the discharge occurs. The unusually well behaved nature of the discharge obtained by this invention is shown in FIG. 5. This invention is a significant improvement over the state of the art gas discharge devices for several reasons. In the prior art when only a DC voltage was applied to the discharge, it broke down at approximately 8–10 kV. Furthermore, in the prior art if the gaps and bias circuit were removed, a higher voltage could be obtained but not to 30 kV, and results were irregular and irreproducible due in part to arcing. The reasons are consistant with the limitations of the prior art, such as Applied Physics Letters 28, 581 (1976) wherein it was implied that the upper limit for a stable operating voltage was approximately 10 kV. However, with the same essential gas discharge apparatus and using the novel circuit of the present invention, we have operated in a well behaved quasistatic equilibrium at 30 kV with consequent higher gain. This three-fold increase in power for pumping is a substantial improvement over the state of the art. One important result of using this invention is that gain is directly proportional to pump power or power density. Other unexpected results are that the peak discharge current increases linearly with charge voltage above a threshold voltage and that this threshold voltage varies linearly with the fluorine partial pressure. The invention provides a stable gas discharge laser which has its maximum voltage available for pumping at the start of the discharge rather than later on during the discharge as is available in other high energy pumping schemes. A laser using this invention can have application in laser isotope separation, laser fusion, or other known high power laser uses.

The various features and advantages of the invention are thought to be clear from the foregoing description. Various other features and advantages not specifically enumerated will undoubtedly occur to those versed in the art as likewise will many variations and modifications of the preferred embodiment illustrated, all of which may be achieved without departing from spirit and scope of the invention defined by the following claims.

What is claimed is:

1. A pulse circuit apparatus for supplying voltage and power at two voltage levels to a gas discharge laser the apparatus comprising:

a gas discharge laser for using a gas as a laser medium;

said gas discharge laser having at least two electrodes substantially defining a discharge region;

a first means for supplying power to said electrodes at a voltage higher than the breakdown voltage of the gas and in a time before the gas can substantially breakdown;

a rapid switch means for connecting the at least two of said electrodes of the gas discharge laser to said first means for supplying voltage across the discharge region in a time less than the time necessary for substantial breakdown of the gas;

a second means for supplying power to said first means;

a first impedance means for impeding the flow of current, said first impedance means connected in parallel to the rapid switch means;

a second impedance means for impeding the flow of current, where said second impedance means is connected in parallel to at least two of said electrodes of the gas discharge laser, said second impedance means having an impedance to current flow of at least three times the impedance for current flow across said at least two electrodes.

2. A pulse circuit apparatus as in claim 1, further including an auxiliary pumping means for increasing the number of free electrons in the gas of the gas discharge laser.

3. A pulse circuit apparatus as in claim 2, wherein the laser medium contains a rare gas excimer after being pumped.

4. A pulse circuit apparatus as in claim 3, wherein the rare gas excimer is KrF.

5. A pulse circuit as in claim 2, wherein the first and second impedance means are resistors.

6. A pulse circuit as in claim 5, wherein the resistances of the first and second impedance means are substantially equal.

7. A pulse circuit as in claim 2, wherein the rapid switch means is a spark gap.

8. A pulse circuit apparatus for supplying voltage and power at two voltage levels to a gas discharge laser, the apparatus comprising:
   a gas discharge laser for using a gas as a laser medium, said gas discharge laser having at least two electrodes substantially defining a discharge region;
   a first means for supplying power to said electrodes at a voltage higher than the breakdown voltage of the gas and in a time before the gas can substantially breakdown;
   a spark gap for connecting the at least two of said electrodes of the laser to said first means for supplying voltage across the discharge region in a time less than the time necessary for substantial breakdown of the gas;
   a second means for supplying power to said first means;
   a first resistor connected in parallel to the spark gap;
   a second resistor connected in parallel to at least two of said electrodes of the gas discharge laser, said second resistor having a resistance of at least three times the resistance for current flow across said at least two electrodes.

9. A method for driving a gas discharge laser wherein there is a gas as a laser medium, the method comprising:
   applying a preconditioning electric field across the gas in the gas discharge laser, the preconditioning electric field being below breakdown voltage for the gas;
   switching a discharge voltage across the gas discharge laser in a time faster than the breakdown of the gas in the gas discharge laser and at a voltage level higher than the breakdown voltage whereby pumping the gas for laser action occurs thereafter through discharge pumping.

10. A method for driving a gas discharge laser wherein there is a gas as a laser medium, the method as in claim 9 further including the step of providing a greater number of free electrons in the gas of the gas discharge laser.

11. A method for driving a gas discharge laser wherein there is a gas as a laser medium, the method as in claim 10 including the step of providing the laser medium with a rare gas excimer after pumping.

12. A method for driving a gas discharge laser wherein there is a gas as a laser medium, the method as in claim 11 including the step of providing KrF as the rare gas excimer.

13. A method for driving a gas discharge laser wherein there is a gas as a laser medium, the method as in claim 10 wherein the preconditioning electric field is substantially half of the later discharge voltage level.

14. A pulse circuit for supplying voltage and power at two voltage levels to a gas discharge device, the circuit comprising:
   a gas discharge device for using a gas as a discharge medium, said gas discharge device having at least two electrodes substantially defining a discharge region;
   a first means for supplying power to said electrodes at a voltage higher than the breakdown voltage of the gas and in a time before the gas can substantially breakdown;
   a rapid switch means for connecting at least two of said electrodes at the device to said first means for supplying voltage across the discharge region in a time less than the time necessary for substantial breakdown of the gas;
   a second means for supplying power to said first means;
   a first impedance means for impeding the flow of current, said first impedance means connected in parallel to the rapid switch means;
   a second impedance means for impeding the flow of current where said second impedance means is connected in parallel to at least two of said electrodes of the gas discharge device, said second impedance means having an impedance to current flow of at least three times the impedance for current flow across said at least two electrodes.

15. A circuit as in claim 14, wherein the gas discharge device is a laser component.

* * * * *